(12) United States Patent
Nakagawa et al.

(10) Patent No.: US 9,925,704 B2
(45) Date of Patent: Mar. 27, 2018

(54) IN-MOLD MOLDING METHOD, IN-MOLD TRANSFER FILM AND MANUFACTURING METHOD THEREFOR

(71) Applicant: Panasonic Intellectual Property Management Co., Ltd., Osaka-shi, Osaka (JP)

(72) Inventors: Takashi Nakagawa, Osaka (JP); Mitsuhiro Yoshinaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 356 days.

(21) Appl. No.: 14/441,442

(22) PCT Filed: Sep. 19, 2013

(86) PCT No.: PCT/JP2013/005522
§ 371 (c)(1),
(2) Date: May 7, 2015

(87) PCT Pub. No.: WO2014/083732
PCT Pub. Date: May 6, 2014

(65) Prior Publication Data
US 2015/0290852 A1 Oct. 15, 2015

(30) Foreign Application Priority Data
Nov. 27, 2012 (JP) .................................. 2012-258065

(51) Int. Cl.
*B29C 45/14* (2006.01)
*B29B 11/00* (2006.01)
(Continued)

(52) U.S. Cl.
CPC ........ *B29C 45/14827* (2013.01); *B29B 11/00* (2013.01); *B29C 45/14262* (2013.01);
(Continued)

(58) Field of Classification Search
None
See application file for complete search history.

(56) References Cited

U.S. PATENT DOCUMENTS

| | | | |
|---|---|---|---|
| 5,707,697 | A | 1/1998 | Spain et al. |
| 7,323,251 | B2 | 1/2008 | Saitou |

(Continued)

FOREIGN PATENT DOCUMENTS

| | | | |
|---|---|---|---|
| JP | 05058098 | * | 3/1993 |
| JP | 07009483 | * | 1/1995 |

(Continued)

OTHER PUBLICATIONS

International Search Report, dated Dec. 24, 2013; PCT/JP2013/005522.

(Continued)

*Primary Examiner* — Edmund Lee
(74) *Attorney, Agent, or Firm* — Hamre, Schumann, Mueller & Larson, P.C.

(57) ABSTRACT

An in-mold molding method of the present invention is a method including: placing an in-mold transfer film in the cavity of an injection molding mold, the in-mold transfer film having a hard coating layer and a transfer section of a printed layer; and peeling, from the base material film of the in-mold transfer film, the transfer section transferred to a molding resin when a molding molded by injecting the molding resin into the cavity is removed by mold opening. The hard coating layer is ruptured in a mold opening process while the in-mold transfer film has a necessary elongation of A % on the side of the molding and the hard coating layer has a rupture elongation of at least A %+2% and less than A %+40% on the side of the molding. With this configuration, the in-mold transfer film can be stably peeled during in-mold molding.

3 Claims, 12 Drawing Sheets

(51) Int. Cl.
*B29C 45/72* (2006.01)
*B29K 101/00* (2006.01)
*B29K 703/00* (2006.01)
*B29L 9/00* (2006.01)
*B29L 31/30* (2006.01)
*B29L 31/00* (2006.01)

(52) U.S. Cl.
CPC .... *B29C 45/7207* (2013.01); *B29C 45/14811* (2013.01); *B29K 2101/00* (2013.01); *B29K 2703/00* (2013.01); *B29K 2715/006* (2013.01); *B29K 2995/002* (2013.01); *B29K 2995/0087* (2013.01); *B29L 2009/00* (2013.01); *B29L 2031/30* (2013.01); *B29L 2031/762* (2013.01)

(56) References Cited

U.S. PATENT DOCUMENTS

| | | | |
|---|---|---|---|
| 7,641,948 | B2 | 1/2010 | Kobayashi et al. |
| 8,652,596 | B2 | 2/2014 | Kaneuchi et al. |
| 2005/0181204 | A1 | 8/2005 | Wang et al. |
| 2005/0191560 | A1* | 9/2005 | Otaki .................. B44C 1/1716 430/1 |
| 2012/0237726 | A1 | 9/2012 | Kaneuchi et al. |
| 2013/0182301 | A1* | 7/2013 | Tsukada ............. B44C 1/1716 359/2 |

FOREIGN PATENT DOCUMENTS

| | | | |
|---|---|---|---|
| JP | 2002-36288 A | | 2/2002 |
| JP | 2007-101651 | | 4/2007 |
| JP | 2007-118467 | | 5/2007 |
| JP | 2008-126442 | | 6/2008 |
| JP | 2010-247498 A | | 4/2010 |
| JP | 2010-120235 A | | 6/2010 |
| JP | 2010-120236 | | 6/2010 |
| JP | 2010-234768 | | 10/2010 |
| JP | 2011-183788 A | | 9/2011 |
| JP | 2012-040814 | | 3/2012 |
| JP | 2012-192698 | | 10/2012 |
| KR | 2011069436 | * | 6/2011 |
| TW | 201105482 A1 | | 2/2011 |
| WO | WO2012043014 | * | 4/2012 |

OTHER PUBLICATIONS

Office Action issued in corresponding Chinese Patent Application No. 201380044606.9 on Jan. 25, 2016 (2 pages) and corresponding English translation (2 pages).
Office Action issued in corresponding Japanese Patent Application No. 2014-549764 on Oct. 23, 2015 (3 pages).

* cited by examiner

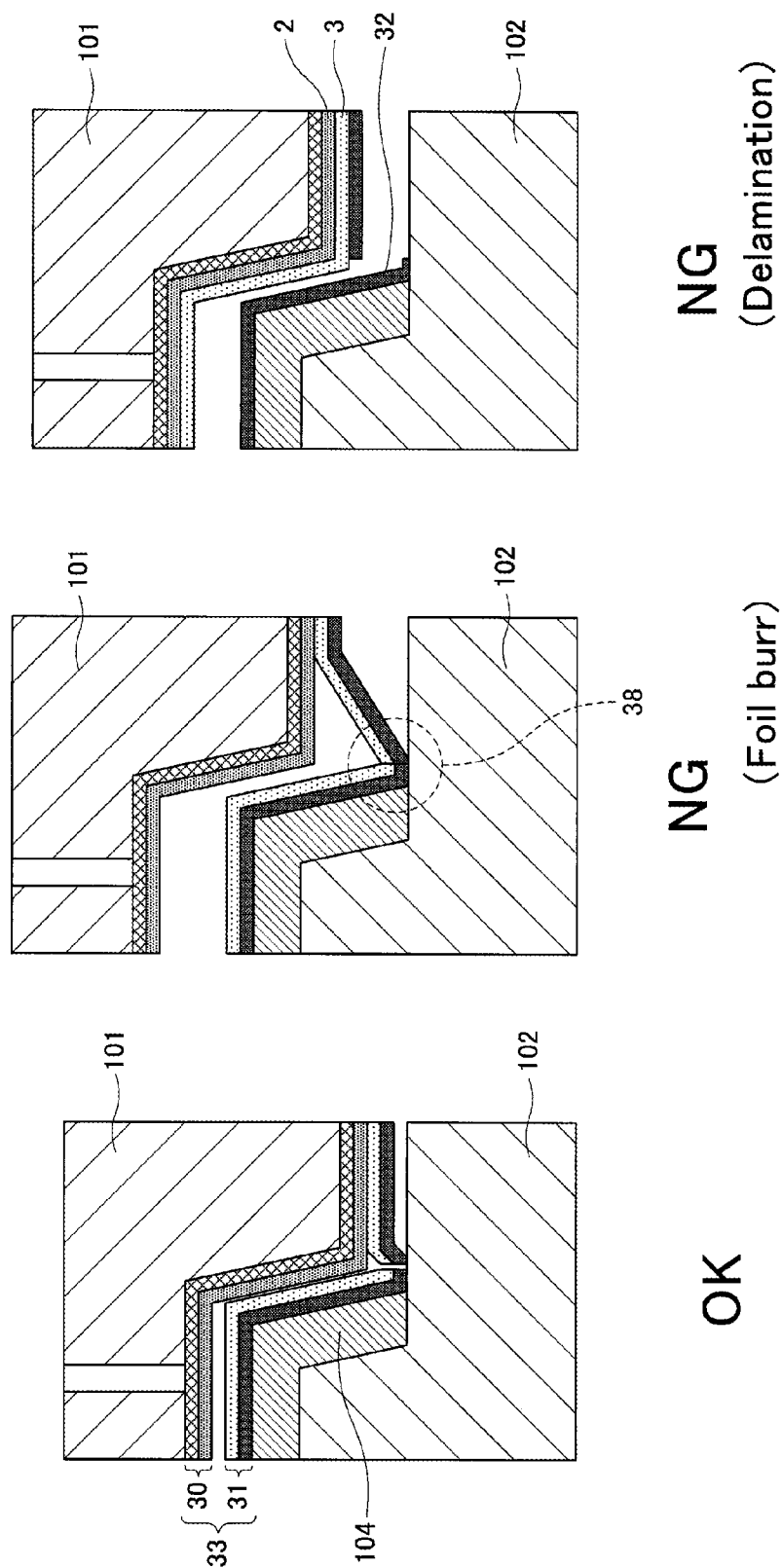

FIG. 13

| Rupture elongation of hard coating layer | | Condition |
|---|---|---|
| Less than 112% | (Less than A + 2%) | Printed layer crack |
| 112% or more and less than 120% | (A + 2% or more and less than A + 10%) | Failure within tolerance |
| 120% or more and less than 135% | (A + 10% or more and less than A + 25%) | Substantially non-defective |
| 135% or more and less than 150% | (A + 25% or more and less than A + 40%) | Failure within tolerance |
| 150% or more | (A + 40% or more) | Foil burr or delamination |

FIG. 14

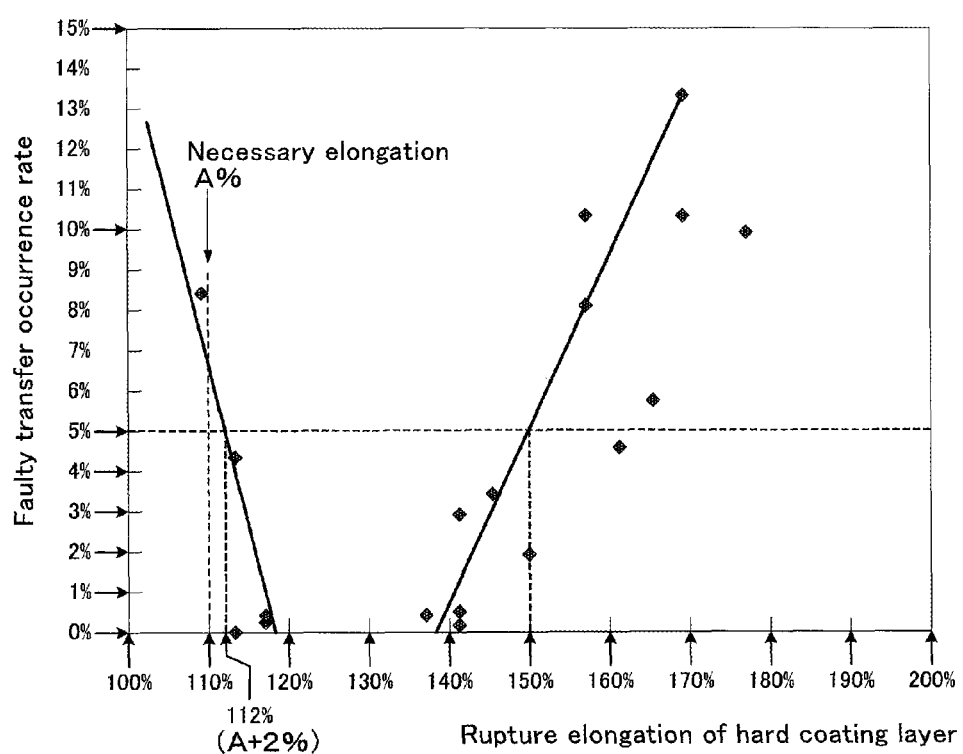

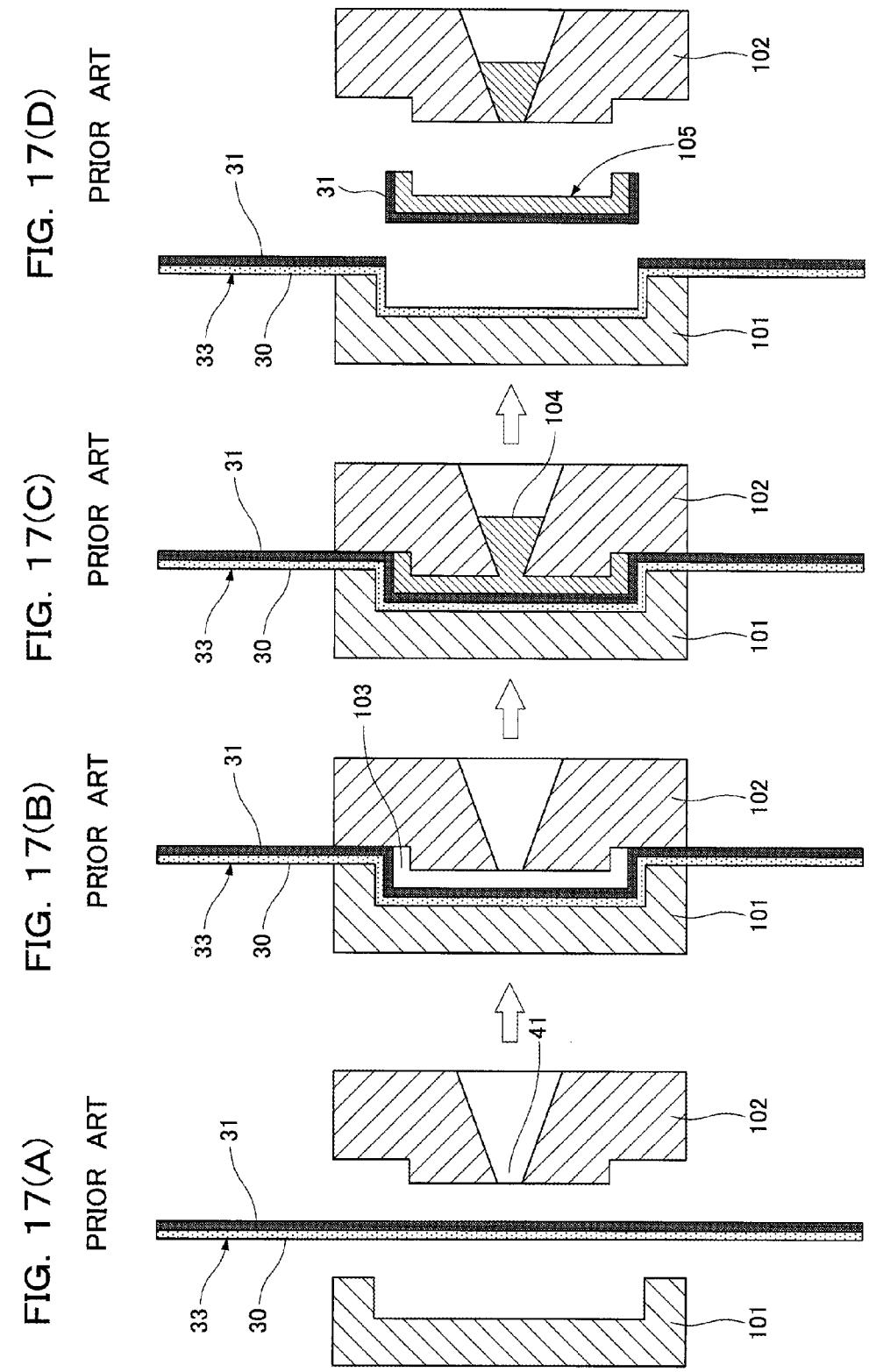

IN-MOLD MOLDING METHOD, IN-MOLD TRANSFER FILM AND MANUFACTURING METHOD THEREFOR

TECHNICAL FIELD

The present invention relates to an in-mold molding method and an in-mold transfer film that are used for manufacturing exterior components for home appliances, automobile components, and so on.

BACKGROUND ART

A conventional method of decorating resin moldings is an in-mold molding technique in which a designed in-mold transfer film and injection resin are combined to have a decorated surface on a resin molding.

FIG. 16 shows a typical layer configuration of an in-mold transfer film 33. The in-mold transfer film 33 includes a carrier section 30 that is composed of a base material film 1 and a release layer 2 and a transfer section 31 that is composed of a hard coating layer 3 and a printed layer 32. The printed layer 32 includes an anchor layer 4, a colored layer 5, and an adhesive layer 6.

The base material film 1 is a base film that constitutes the in-mold transfer film 33. The foregoing layers are formed on the base material film 1. The release layer 2 has the function of completely separating the transfer section 31 formed on the release layer 2. The hard coating layer 3 of the transfer section 31 has the function of protecting a molding from scratches or dust on the outermost layer of the in-mold molding. The anchor layer 4 has the function of joining the hard coating layer 3 and the colored layer 5.

The anchor layer 4 also has the function of adsorbing or anchoring ink in the colored layer 5 and thus is not necessary if ink can be directly joined to the hard coating layer 3. The colored layer 5 is a layer for adding a design to a molding. The colored layer 5 that adds figures and patterns varies in layer configuration, e.g., from a single layer to multiple layers depending on the configurations of figures and patterns. Moreover, the colored layer 5 is formed by gravure printing, screen printing, solvent ink jet printing, and so on. The adhesive layer 6 has the function of joining the colored layer 5 and injection resin and the function of protecting ink in the colored layer 5 from high-temperature and high-pressure injection resin, precluding a flow of ink.

FIGS. 17(A) to 17(D) are explanatory drawings of a typical in-mold molding method.

In FIG. 17(A), the in-mold transfer film 33 having figures and patterns is drawn from a winding body (not shown) and then is supplied between a movable mold 101 and a stationary mold 102 with the transfer section 31 facing a nozzle 41 of the stationary mold 102. The carrier section 30 faces the movable mold 101.

In FIG. 17(B), the in-mold transfer film 33 is sucked and fixed along the molding surface of the movable mold 101 and is shaped along the mold surface shape of the movable mold 101. After that, the movable mold 101 is moved so as to close the movable mold 101 and the stationary mold 102, forming a cavity space 103 between the transfer section 31 and the stationary mold 102.

In FIG. 17(C), high-temperature and high-pressure molding resin 104 is injected into the cavity space 103 toward the transfer section 31 and then is bonded to the transfer section 31.

In FIG. 17(D), a molding 105 cooled to a mold temperature is removed. In this step, when the molds are opened, the transfer section 31 is peeled between the release layer 2 and the hard coating layer 3 and then is removed out of the molds. At this point, the transfer section 31 is transferred to the surface of the molding 105 and thus the hard coating layer 3 serves as the outermost surface of the molding 105, obtaining the molding 105 composed of the transfer section 31 and the molding resin 104.

CITATION LIST

Patent Literature

Patent Literature 1: Japanese Patent Laid-Open No. 2008-126442

SUMMARY OF INVENTION

Technical Problem

However, in the case of in-mold molding where the side of the molding 105 is particularly tall substantially in an upright position, the transfer section 31 needs to be extended in contact with the carrier section 30 according to an extension of the base material film 1 on the side of the molding 105 along the shape of the molding. If the hard coating layer 3 is insufficiently extended, the hard coating layer 3 ruptures during the extension, causing a break on the printed layer 32.

Even if the hard coating layer 3 is sufficiently extended, the carrier section 30 is separated from the molding with the release layer 2 and the hard coating layer 3 in contact with each other when the molds are opened. This leads to delamination in the printed layer 32.

Even if the transfer section 31 is sufficiently peeled from the carrier section 30, a foil burr may occur such that the transfer section 31 continues from the side of the molding to the outside. In this case, the molding can be made acceptable by removing the foil burr from the molding. However, secondary machining is necessary after the molding is removed, leading to higher cost in view of working expenses and an operation time. Moreover, a foil burr may spread in the molds when the molding is removed. If a spread foil burr is deposited on the cavity surface of the mold, unrepairable exterior defects may occur, for example, foil burr marks may be transferred to the molding in the subsequent molding operation.

The present invention is devised to solve the conventional problems. An object of the present invention is to provide an in-mold molding method, an in-mold transfer film, and a manufacturing method therefore, in which a hard coating layer is not ruptured by an elongation of an in-mold transfer film according to the shape of a molding and can be sufficiently ruptured on the end of the side of the molding during mold opening, achieving stable exfoliation without causing breaks or delamination on a printed layer or foil burrs.

Solution to Problem

An in-mold molding method according to the present invention includes: a preheating step of preheating an in-mold transfer film having a release layer, a hard coating layer, and a printed layer on a base material film; a placing step of placing the in-mold transfer film in the cavity of an injection molding mold; a clamping step of clamping the injection molding mold; an injecting step of injecting a molding resin into the cavity containing the in-mold transfer film; and a mold opening step of opening the injection molding mold so as to obtain a molding having a transfer surface where the hard coating layer and the printed layer peeled from the base material film are transferred, wherein the in-mold transfer film has a necessary elongation of A % on the side of the molding, and the hard coating layer is ruptured in the mold opening step while the hard coating layer has a rupture elongation of at least A %+2% and less than A %+40% on the side of the molding.

An in-mold transfer film according to the present invention is an in-mold transfer film used when in-mold molding is performed using an injection molding mold, the in-mold transfer film having a release layer, a hard coating layer, and a printed layer on a base material film, the in-mold transfer film having a necessary elongation of A % on the side of a molding molded using the injection molding mold, the hard coating layer having a rupture elongation of at least A %+2% and less than A %+40% when the temperature of the in-mold transfer film is equal to a surface temperature during mold opening of the injection molding mold used for in-mold molding.

A manufacturing method for an in-mold transfer film according to the present invention is a manufacturing method for an in-mold transfer film used when in-mold molding is performed using an injection molding mold, the in-mold transfer film having a release layer, a hard coating layer, and a printed layer on a base material film, the hard coating layer being made of an ultraviolet curing resin, the in-mold transfer film having a necessary elongation of A % on the side of a molding molded using the injection molding mold, the manufacturing method including: adjusting the integrated amount of ultraviolet irradiation to the hard coating layer such that the hard coating layer has a rupture elongation in the range of at least A %+2% and less than A %+40% when the temperature of the in-mold transfer film is equal to a surface temperature during mold opening of the injection molding mold used for in-mold molding.

Advantageous Effects of Invention

According to the in-mold molding method of the present invention, adhesion is kept for the elongation of the in-mold transfer film according to the shape of the molding, clearly extending a transfer section, which includes the printed layer and the hard coating layer, according to the elongation of a carrier section including the base material film and the release layer. When the carrier section is peeled from the molding, the hard coating layer of the transfer section is ruptured on the end of the side of the molding at the moment of extension of the in-mold transfer film in mold opening. Thus, the start point of exfoliation is formed on the end of the side of the molding, and the hard coating layer is peeled from the carrier section from the start point around the molding without causing a "foil burr."

Moreover, according to the in-mold transfer film of the present invention, the hard coating layer can be sufficiently ruptured on the end of the side of the molding and peeling can be started from the end of the side of the molding when the carrier section of the in-mold transfer film is separated from the molding, achieving stable exfoliation without causing foil burrs or faulty transfer.

Furthermore, according to the manufacturing method for an in-mold transfer film of the present invention, the integrated amount of ultraviolet irradiation is adjusted according to a mold opening temperature. Thus, an increasing rate of the rupture elongation of the hard coating layer relative to a temperature increase at the mold opening temperature or higher can be set larger than an increasing rate of the rupture elongation of the hard coating layer relative to a temperature increase at a temperature lower than the mold opening temperature. This can stably supply the in-mold transfer film so as to contribute to satisfactory in-mold molding.

BRIEF DESCRIPTION OF DRAWINGS

FIG. 6(A) is a mold cross-sectional view showing a peeled state of the in-mold transfer film immediately after mold opening according to the embodiment of the present invention.

FIG. 6(B) is a mold cross-sectional view showing a peeled state of the in-mold transfer film immediately after the mold opening according to the embodiment of the present invention.

FIG. 6(C) is a mold cross-sectional view showing a peeled state of the in-mold transfer film immediately after the mold opening according to the embodiment of the present invention.

FIG. 13 shows examples of the rupture elongation of the hard coating layer and a state of exfoliation of the molding according to the example of the embodiment of the present invention.

FIG. 14 shows a plot of occurrence rates of faulty transfer relative to a design of the rupture elongation of the hard coating layer according to the example of the embodiment of the present invention.

FIG. 17(A) shows a manufacturing step for a conventional in-mold molding.

FIG. 17(B) shows a manufacturing step for the conventional in-mold molding.

FIG. 17(C) shows a manufacturing step for the conventional in-mold molding.

FIG. 17(D) shows a manufacturing step for the conventional in-mold molding.

DESCRIPTION OF EMBODIMENTS

An in-mold molding method of the present invention will be described below in accordance with specific embodiments.

Figure 16:
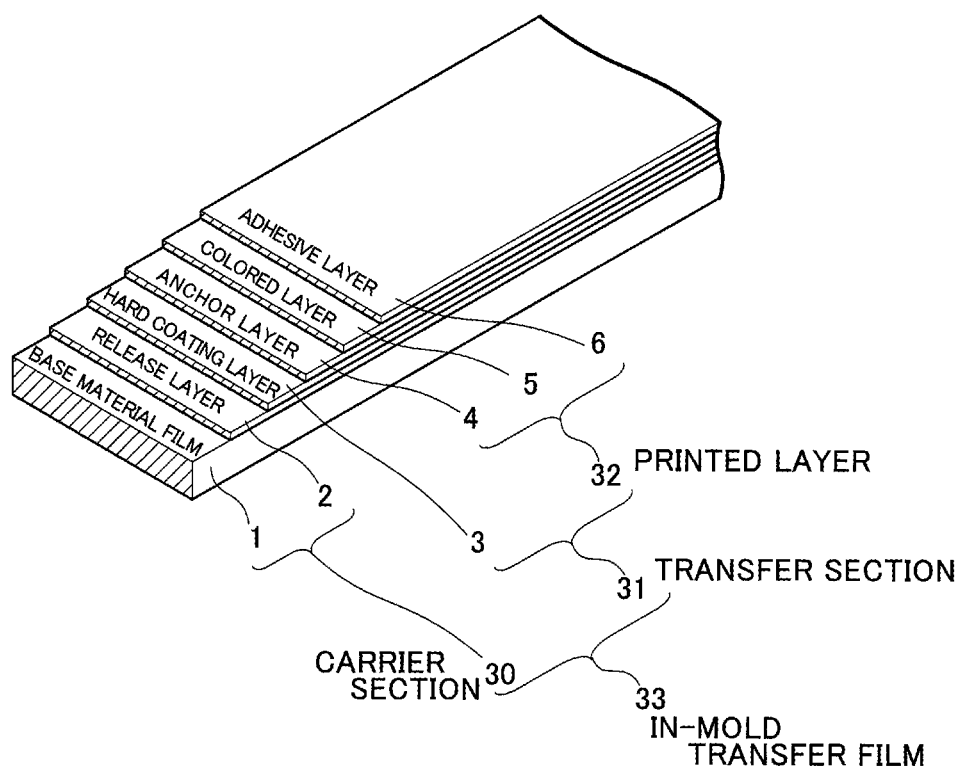
FIG. 16 shows the layer configuration of the in-mold transfer film.

The layer configuration of a used in-mold transfer film 33 is identical to that of FIG. 16. The in-mold transfer film 33 includes a carrier section 30 that is composed of a base material film 1 and a release layer 2 and a transfer section 31 that is composed of a hard coating layer 3 and a printed layer 32. The printed layer 32 includes an anchor layer 4, a colored layer 5, and an adhesive layer 6.

The base material film 1 is primarily composed of polyethylene terephthalate (PET). The base material film 1 may be composed of polycarbonate (PC) or oriented polypropylene (OPP). The base material film 1 is a layer of about 20 μm to 200 μm in thickness. However, if the base material film 1 is too thin, the base material film 1 is easily ruptured when being extended. If the base material film 1 is too thick, the base material film 1 is hard to deform. Thus, the optimum thickness of the base material film 1 is about 30 μm to 100 μm.

The release layer 2 is composed of a melamine resin or a silicon resin and has a thickness of about 0.5 μm to 5 μm.

The hard coating layer 3 is composed of a hard ultraviolet curing resin or the like and has a thickness of about 1 μm to 10 μm. The hard coating layer 3 serves as an outermost surface when the printed layer 32 is transferred to a molding resin.

The anchor layer 4 is composed of a polyester resin or the like and has a thickness of about 1 μm to 10 μm. The anchor layer 4 increases adhesion between the hard coating layer 3 and the colored layer 5 so as to improve properties.

The colored layer 5 is composed of a pigmented ink with high weather resistance or a generally available pigmented ink and has a thickness of about 1 μm to 100 μm.

The adhesive layer 6 is composed of an acrylic resin, urethane resin, or vinyl resin with in-mold resistance and has a thickness of about 1 μm to 50 μm.

For example, the colored layer 5 and the adhesive layer 6 are not always composed of respective layers. Each of the layers may include stacked layers.

As in a manufacturing process for a conventional in-mold molding in FIG. 17, (a) the in-mold transfer film 33 is supplied into molds, (b) the in-mold transfer film 33 is adsorbed to a movable mold 101 and is closed in alignment with a stationary mold 102, (c) a molding resin 104 is injected into a cavity space 103 and then the injected resin is bonded to the in-mold transfer film, (d) after the opening of the movable mold 101, the transfer section 31 not in contact with the molding resin 104 remains on the carrier section 30, the bonded transfer section 31 is transferred to the molding resin 104 and is peeled from the carrier section 30, forming the in-mold molding.

Figure 1:
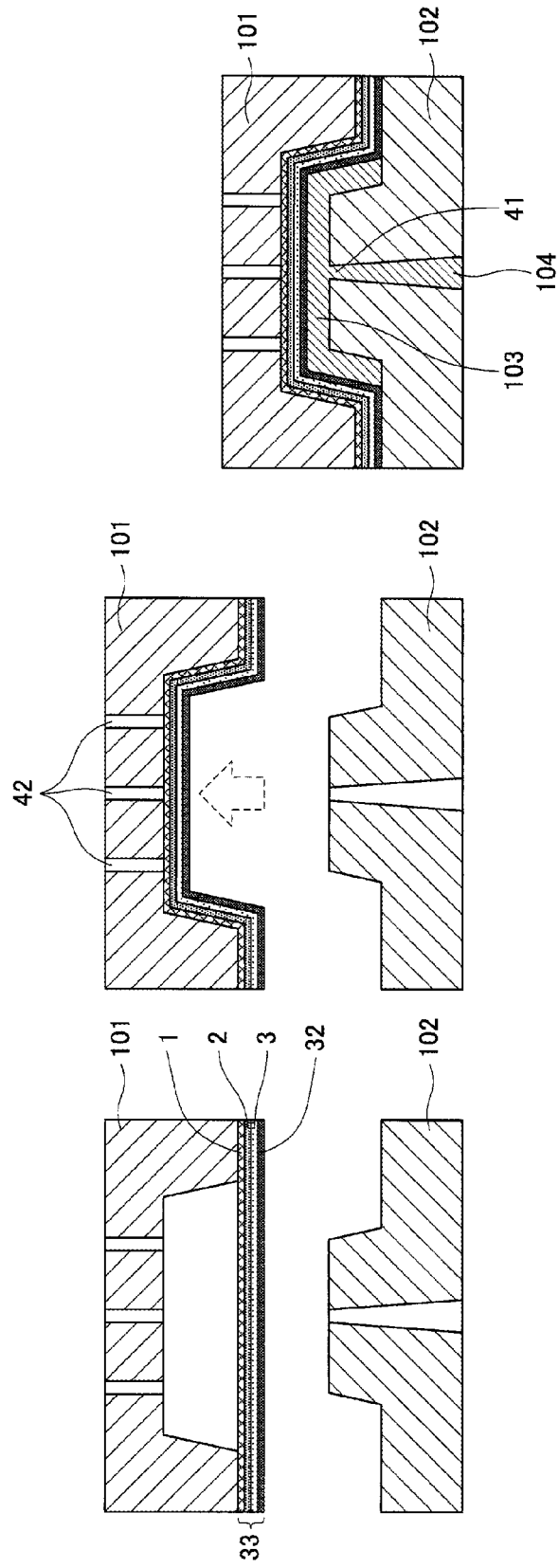
FIG. 1(A) is a mold cross-sectional view showing a state from a placing step of placing an in-mold transfer film into the cavity of an injection molding mold to an injection molding step of injecting a molding resin into the cavity according to an embodiment of the present invention.
FIG. 1(B) is a mold cross-sectional view showing a state of the injection molding step.
FIG. 1(C) is a mold cross-sectional view showing a state of the injection molding step.

FIGS. 1(A) to 1(C) are cross-sectional views showing a state of the molding in the manufacturing process for the in-mold molding.

In FIG. 1(A), the movable mold 101 and the stationary mold 102 are separated from each other. The in-mold transfer film 33 including the base material film 1, the release layer 2, the hard coating layer 3, and the printed layer 32 is supplied into the molds including the movable mold 101 and the stationary mold 102. FIG. 1(A) shows a state before the in-mold transfer film 33 is sucked into the movable mold 101 to dispose the in-mold transfer film 33 in the cavity of an injection molding mold.

In FIG. 1(B), the in-mold transfer film 33 is sucked by suction holes 42 provided in the cavity of the movable mold 101 and thus the in-mold transfer film 33 is sucked to the cavity surface of the movable mold 101.

FIG. 1(C) shows that a resin is injected into the cavity space 103 from a nozzle 41 to form the in-mold molding in the molds.

At this point, the in-mold transfer film 33 is extended according to the shape, inclination, and depth of a side 34 of the molding. The movable mold 101 and the in-mold transfer film 33 first come into contact with each other, and then a space between a fixed surface and the in-mold transfer film is evacuated. Thus, the in-mold transfer film is sucked to the cavity surface of the movable mold 101 while being extended.

Figure 2:
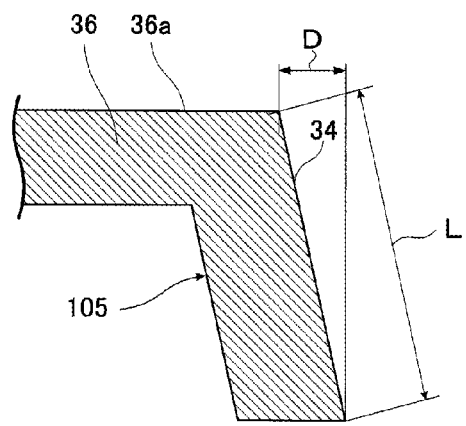
FIG. 2 is a cross-sectional view that defines the elongation of the in-mold transfer film on the side of a molding according to the embodiment of the present invention.

FIG. 2 shows an elongation of the in-mold transfer film 33 on the side 34 of the molding. A printed-portion transfer surface 36 of the molding resin 104 includes a top surface 36a and the side 34.

The in-mold transfer film 33 has a necessary elongation A that is defined as follows:

necessary elongation A=L/D where D is the length of a projected portion of the side 34 on a plane perpendicular to a clamping direction, and L is the length of the edge of the side 34.

Figure 3:
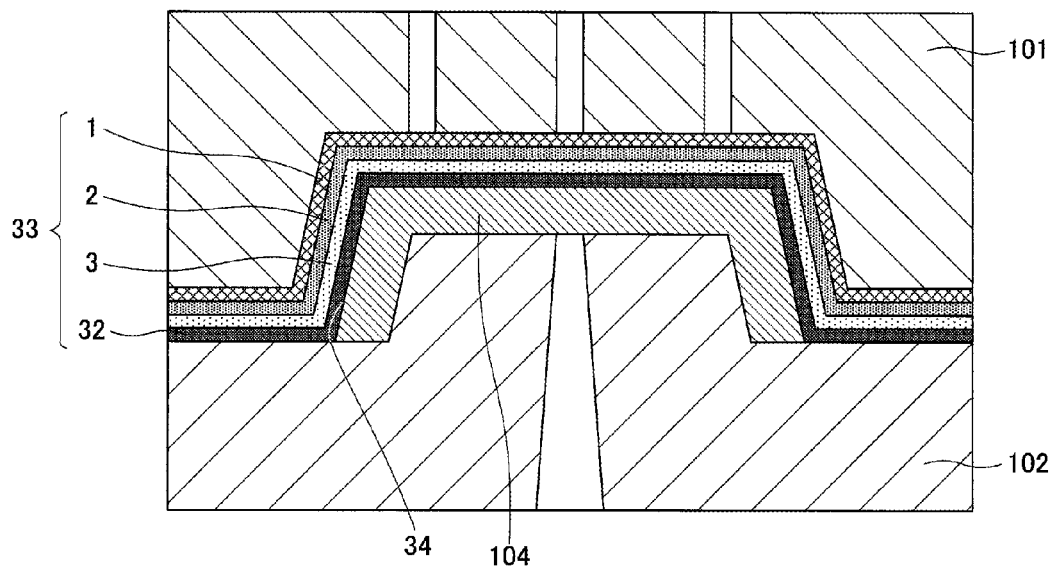
FIG. 3 is a mold cross-sectional view showing the in-mold molding according to the embodiment of the present invention.

FIG. 3 is a cross-sectional view of the molding in the molds after the resin is injected. The movable mold 101 and the stationary mold 102 are closed and the molding resin 104 is injected next to the printed layer 32 of the in-mold transfer film 33 in the cavity space. The in-mold transfer film 33 sucked to the movable mold 101 includes the base material film 1 sucked to the movable mold 101. If the side 34 of the molding has a large inclination as shown in FIG. 3, the in-mold transfer film 33 is sucked to the movable mold 101 while being extended. The base material film 1, the release layer 2, the hard coating layer 3, and the printed layer 32 that constitute the in-mold transfer film 33 need to be sucked while being all uniformly extended.

If any one of the base material film 1, the release layer 2, the hard coating layer 3, and the printed layer 32 is ruptured by an extension, the printed layer cannot be transferred to the molding resin in a proper condition. This requires properties that extend the layers constituting the in-mold transfer film 33 to an elongation that allows transfer to the shape of the molding.

Thus, the rupture elongations of the layers of the in-mold transfer film 33 are set at or higher than a necessary elongation that allows transfer to the side 34 of the molding. Hereinafter, an elongation required for transfer to the side 34 of the molding will be referred to as "necessary elongation".

The base material film 1 increased in thickness can be resistant to rupture even after being extended to have a smaller thickness. Moreover, according to a manufacturing method that does not fully extend the base material film formed by biaxial stretching, the base material film can be more elongated.

The hard coating layer 3 may be made of an after-cure ultraviolet curing resin that is not completely cured, obtaining a higher elongation. In the formation of the in-mold transfer film 33, the in-mold transfer film 33 can be cured by thermal dry or a small amount of ultraviolet irradiation so as not to affect the formation of the hard coating layer 3 that is not completely cured.

Figure 4:
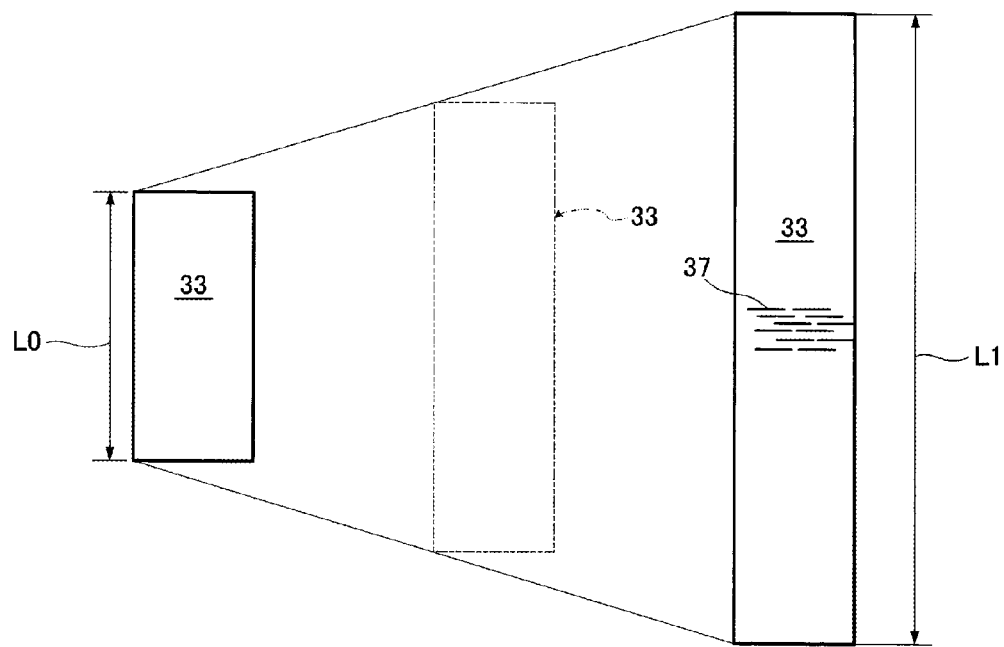
FIG. 4 shows the definition of the rupture elongation of a hard coating layer according to the embodiment of the present invention.

As shown in FIG. 4, the rupture elongation of the hard coating layer 3 in the in-mold transfer film 33 is an elongation value when cracks 37 appear during an extension of the hard coating layer 3 in a certain direction in the temperature condition of the hard coating layer 3. The rupture elongation can be defined as L1/L0 where L1 is the length of the hard coating layer 3 when cracks appear relative to an initial length L0 of the hard coating layer 3.

The progress of ultraviolet curing is changed by adjusting thermal dry conditions or a small amount of ultraviolet irradiation, and the rupture elongation can be set at or higher than the necessary elongation. The curing state of the hard coating layer 3 and the rupture elongation are correlated with each other. The rupture elongation decreases as the hard coating layer 3 is cured.

In the curing process of the hard coating layer 3, the hard coating layer 3 at a low degree of curing is soft and thus has high adhesion to the surface of the release layer, leading to a tendency to heavy weight exfoliation, whereas the hard coating layer 3 at a high degree of curing is hard and thus has low adhesion to the surface of the release layer, leading to a tendency to light weight exfoliation. According to these properties, the curing state of the hard coating layer 3 can be evaluated by the weight of exfoliation.

The rupture elongations of the release layer 2, the anchor layer 4, the colored layer 5, and the adhesive layer 6 can be also set at or higher than the necessary elongation for transfer to the side of the molding according to the thicknesses and materials. The elongations can be raised by increasing the ratio of an elastic urethane resin which is resistant to elongation.

Figure 5:
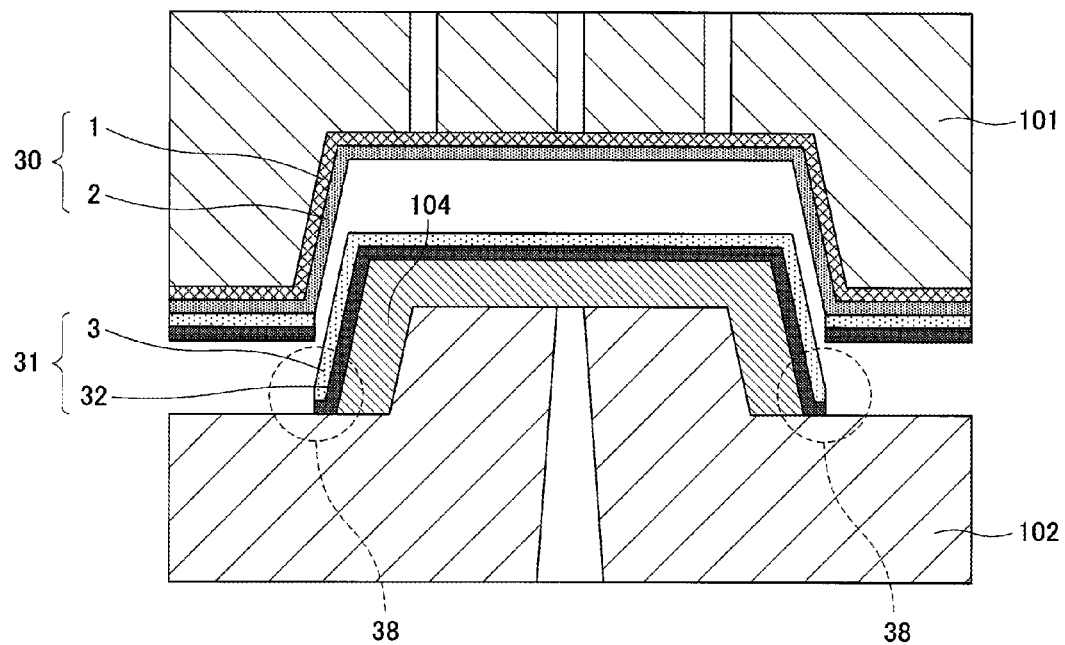
FIG. 5 is a mold cross-sectional view showing the in-mold molding that is normally peeled during mold opening according to the embodiment of the present invention.

FIG. 5 shows the opened movable mold 101 and stationary mold 102. The transfer section 31 including the hard coating layer 3 and the printed layer 32 is peeled from the carrier section 30 including the base material film 1 and the release layer 2. In the mold opening, the transfer section 31 transferred to the molding resin in an ideal state is peeled at the interface of the release layer of the carrier section 30. From an end 38 on the side of the molding, the hard coating layer 3 and the printed layer 32 are left only on a bonded portion to the molding resin 104, whereas an unbonded portion of the transfer section 31 to the molding resin 104 is separated and left on the carrier section 30.

FIGS. 6(A) to 6(C) are mold cross-sectional views showing a peeled state of the in-mold transfer film 33 immediately after the molds are opened according to the embodiment of the present invention. In this state, the movable mold 101 and the stationary mold 102 are opened and the transfer section 31 of the in-mold transfer film 33 is peeled from the carrier section 30 and then is transferred to the molding resin 104.

FIG. 6(A) shows a state of an in-mold molding where the transfer section 31 is peeled off in an ideal state by an action of the in-mold transfer film 33 in the mold opening after the transfer section 31 is transferred to the molding resin 104.

In FIG. 6(B), the transfer section 31 is not ruptured on the end 38 of the side of the molding during the mold opening, causing a foil burr, which is a part of the transfer section 31 extending from the end 38 of the side of the molding to the outside. In FIG. 6(C), delamination occurs between the hard coating layer 3 and the printed layer 32 in the transfer section 31 to be originally separated between the hard coating layer 3 and the release layer 2 during the mold opening.

In the exfoliation of the transfer section 31 in the ideal state of FIG. 6(A), the in-mold transfer film 33 is extended at least to the necessary elongation during the mold opening. At this point, the hard coating layer is also extended. When the hard coating layer 3 extended at least to the necessary elongation reaches the rupture elongation of the hard coating layer 3, the hard coating layer 3 ruptures from the end 38 of the side of the molding. When the hard coating layer 3 ruptures, the printed layer 32 forming the transfer section 31 is more likely to be ruptured than the hard coating layer 3 because the printed layer 32 has a smaller thickness than the hard coating layer 3. Moreover, the printed layer 32 in contact with the hard coating layer 3 is also ruptured when the hard coating layer 3 is ruptured. Thus, the transfer section 31 can be fully peeled at the end 38 of the side of the molding.

Also in the state of a foil burr in FIG. 6(B), the in-mold transfer film 33 is extended at least to the necessary elongation during the mold opening. If the hard coating layer 3 has an extremely large rupture elongation, the transfer section 31 is peeled with the molding while the hard coating layer 3 does not reach the rupture elongation, that is, the hard coating layer 3 is not ruptured. Thus, the transfer section 31 is left outside the end 38 of the side of the molding.

In this case, the molding can be made acceptable by removing a foil burr from the molding. However, secondary machining is necessary after the molding is removed, leading to higher cost in view of working expenses and an operation time. When the molding is removed, if a foil burr spreads in the molds and is deposited on the cavity surface, unrepairable exterior defects may occur, for example, foil burr marks may be transferred to the molding in the subsequent molding operation.

In the state of delamination in FIG. 6(C), the in-mold transfer film 33 is extended at least to the necessary elongation when opening the molds, and adhesion between the hard coating layer 3 and the release layer 2 exceeds adhesion between the hard coating layer 3 and the printed layer 32. In this state, even the extended hard coating layer 3 is not ruptured and is deposited next to the release layer 2. This causes intralaminar fracture in the printed layer 32, leading to faulty transfer of the in-mold molding. In this case, the in-mold molding cannot be recovered to a normal condition and thus is discarded as a defective item.

Figure 7A:
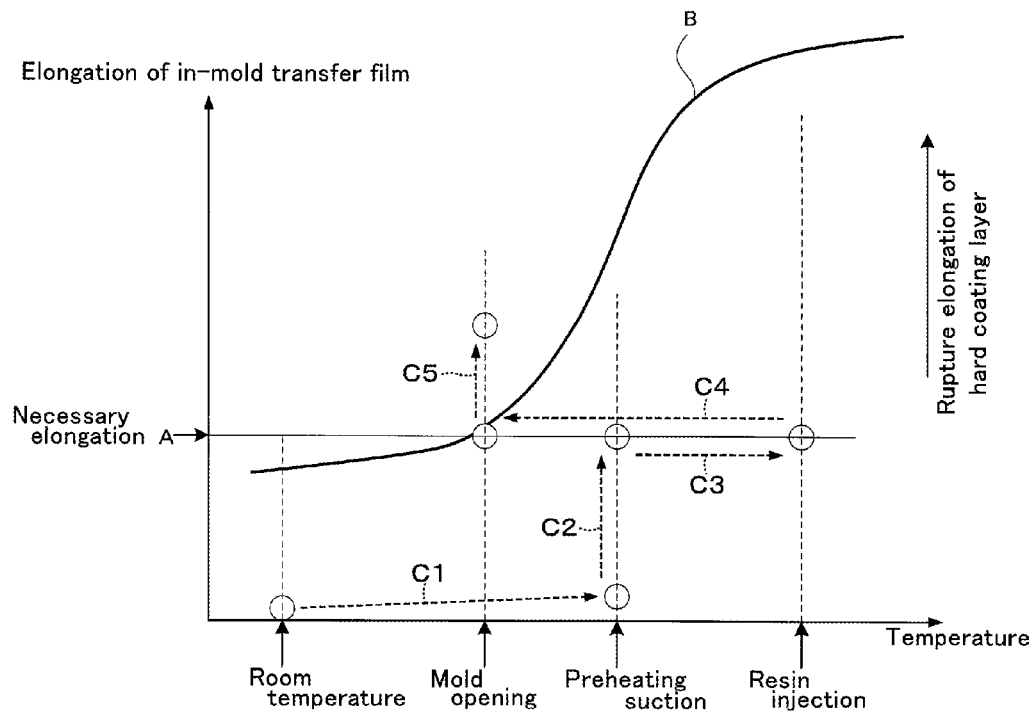
FIG. 7(A) shows the rupture elongations of the hard coating layer and the temperature behaviors of the in-mold transfer film according to the embodiment of the present invention.

FIG. 7(A) shows the changing properties of a rupture elongation relative to a temperature of the hard coating layer 3 of the in-mold transfer film 33, and an elongation behavior of the in-mold transfer film 33 in the in-mold molding on the end 38 where peeling is necessary on the side of the molding. Reference character A denotes the necessary elongation of the in-mold transfer film 33 on the end 38 where peeling is necessary on the side of the molding. A solid line B is the rupture elongation line of the hard coating layer 3. Broken line arrows C1 to C4 indicate the elongation behaviors of the in-mold transfer film 33.

The rupture elongation of the hard coating layer 3 of the in-mold transfer film 33 has the property of increasing with a temperature. According to this property, the temperature of the in-mold transfer film 33 is increased when the in-mold transfer film 33 is sucked to the movable mold 101. This can increase the rupture elongation of the hard coating layer 3 at least to the necessary elongation A.

At room temperature, the rupture elongation of the hard coating layer 3 is lower than the necessary elongation A. If the in-mold transfer film 33 is sucked to the movable mold 101 at this temperature, the hard coating layer 3 is ruptured and the printed layer 32 is cracked. Thus, as indicated by the broken line arrow C1, the in-mold transfer film 33 is preheated to increase the temperature of the hard coating layer 3. This allows the rupture elongation of the hard coating layer 3 to exceed the necessary elongation A, preventing cracks on the printed layer 32 when the in-mold transfer film 33 is sucked to the movable mold 101.

A specific preheating method for increasing the temperature of the in-mold transfer film 33 may be radiant heating with an infrared heater or heating with warm air when the in-mold transfer film 33 is supplied into the molds including the movable mold 101 and the stationary mold 102. Since warm air may displace a film supply position or further deposit foreign matters such as dust, radiant heating with an infrared heater is more desirable.

Although the temperature of the molds may be increased when the film is sucked, heating to the molds with a heater needs a temperature decrease of the molds when the molding is removed. Thus, a cooling circuit is necessary at the same time.

Subsequently, as indicated by the broken line arrow C2, the in-mold transfer film 33 is extended along the cavity surface of the movable mold 101 by suction. Moreover, as indicated by the broken line arrow C3, the high-temperature molding resin 104 is applied during resin injection. Thus, the temperature of the in-mold transfer film 33 instantly increases. The temperature increase of the in-mold transfer film 33 may raise the rupture elongation of the hard coating layer 3 even if a part of the in-mold transfer film 33 is not fully sucked to the cavity surface of the movable mold 101. This reduces the probability of cracks on the printed layer 32 when a resin flow extends the in-mold transfer film 33 during resin injection.

Figure 8:
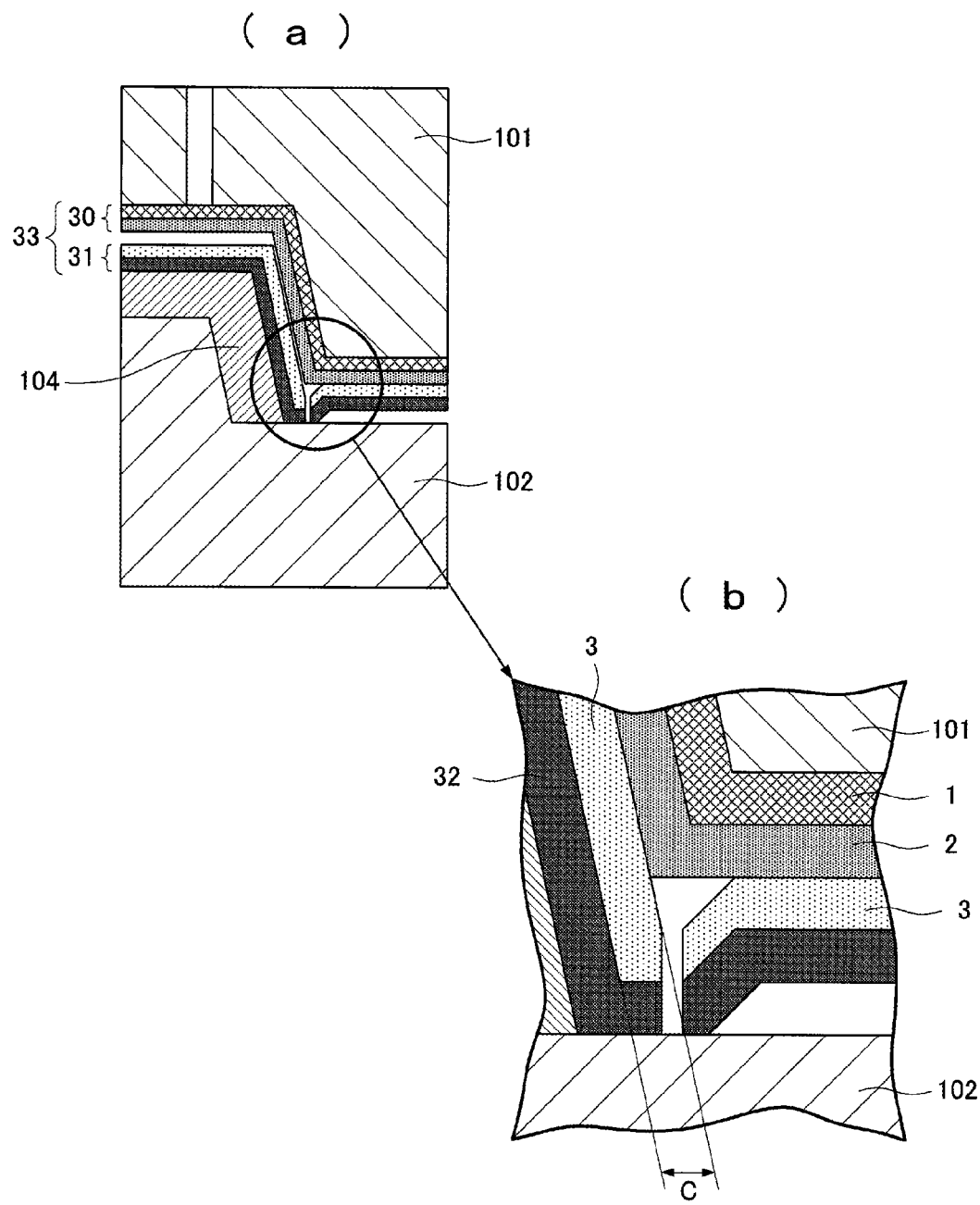
FIG. 8 shows a mold cross-sectional view of a peeled state of the in-mold transfer film immediately after mold opening, and an enlarged view of the principal part of the in-mold transfer film according to the embodiment of the present invention.

After the injection of the molding resin 104, as indicated by the broken line arrow C4, the temperature of the in-mold transfer film 33 bonded to the molding is substantially equal to a mold temperature. At this point, the elongation of the in-mold transfer film 33 is not higher than the rupture elongation of the hard coating layer 3. As indicated by a broken line arrow C5, during mold opening, the end 38 where peeling is necessary on the side of the molding is locally extended and thus the elongation of the in-mold transfer film 33 exceeds the rupture elongation. This can easily set an exfoliation start point of the hard coating layer 3 on the end 38 of the side of the molding after the transfer section 31 is normally transferred to the molding after injection molding. As shown in FIGS. 8(a) and 8(b), the local extension is considered an elongation of a portion C corresponding to the thickness of the hard coating layer 3 on the end 38 where exfoliation is necessary on the side of the molding.

The mold temperature is a temperature where the injection molding resin stably flows. Thus, in normal injection molding, the mold temperature is set according to resin flowability. Although the mold temperature can be intentionally reduced after injection molding, a cooling circuit is necessary as has been discussed.

When the in-mold transfer film 33 is sucked thus, the temperature of the film is raised so as to set the rupture elongation of the hard coating layer 3 at or higher than the necessary elongation A.

When the hard coating layer 3 is peeled from the release layer 2 in the in-mold transfer film 33 during mold opening, a temperature decrease of the in-mold transfer film 33 can reduce the rupture elongation of the hard coating layer 3 at least to the necessary elongation A. Thus, the hard coating layer 3 can be more stably peeled on the end 38 of the side of the molding.

Figure 9:
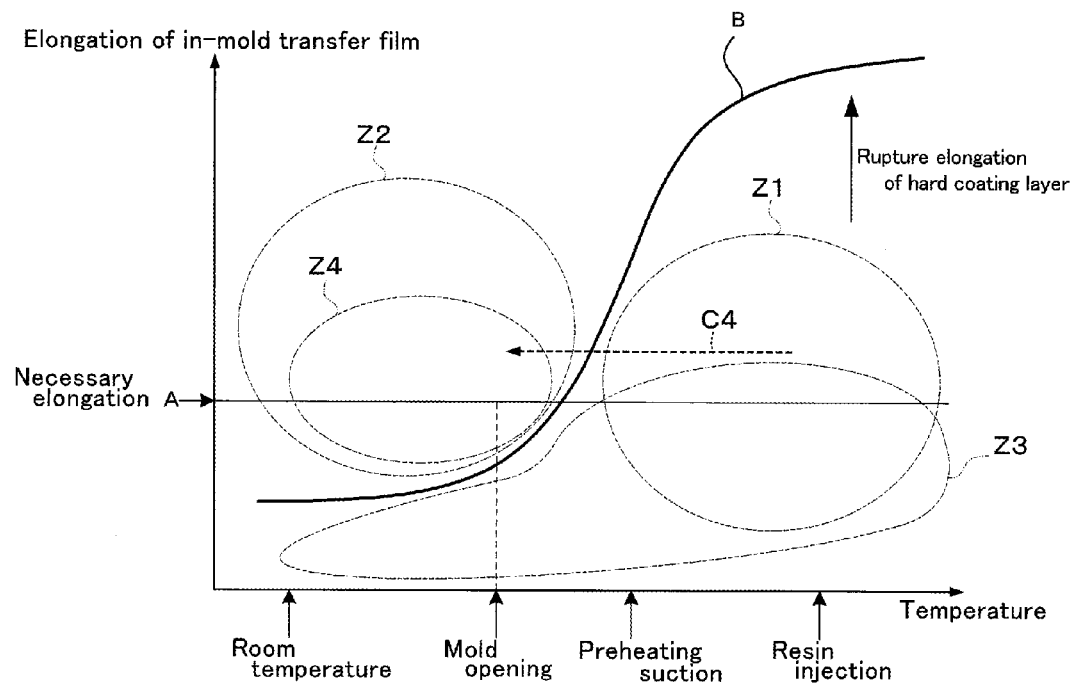
FIG. 9 is an explanatory drawing of FIGS. 7(A) and 7(B).

In FIG. 7(A), when the elongation of the in-mold transfer film 33 crosses the hard-coating-layer rupture elongation line B from a right region (Z1 in FIG. 9) to a left region (Z2 in FIG. 9), that is, when the elongation passes through the hard-coating-layer rupture elongation line B from a high temperature region to a low temperature region, the hard coating layer 3 is cracked. Specifically, an elongation behavior of the in-mold transfer film 33 over the molding needs to be located in a lower right region (Z3 in FIG. 9) of the hard-coating-layer rupture elongation line B. Moreover, during exfoliation, only the end 38 of the side of the molding needs to be located in an upper left region (Z4 in FIG. 9) of the hard-coating-layer rupture elongation line B. At this point, a portion having a higher elongation than the end 38 of the side of the molding is inevitably cracked.

Figure 7B:
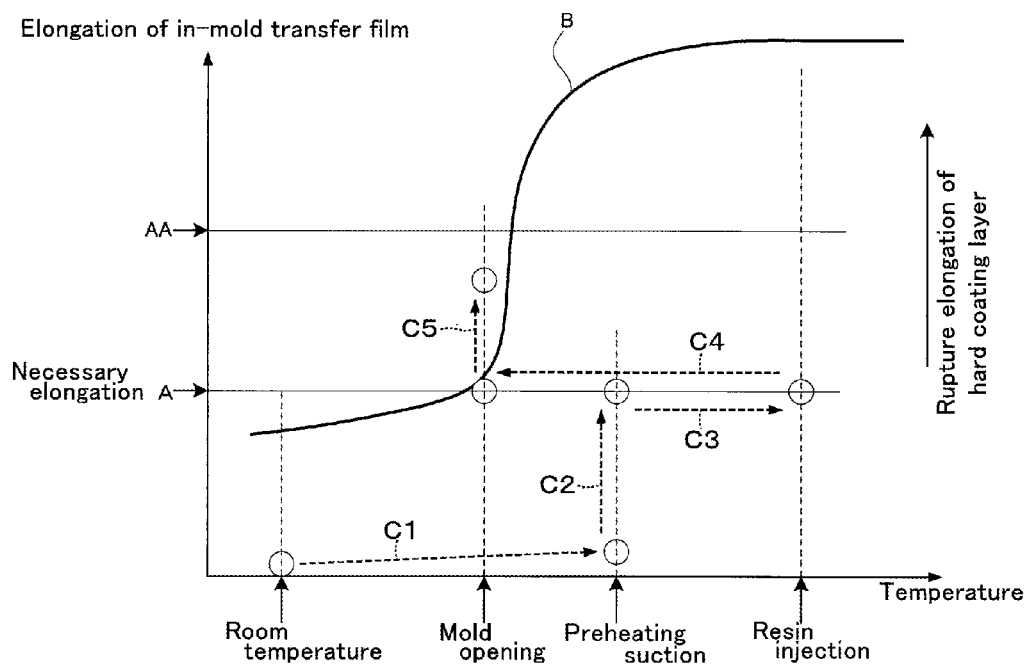
FIG. 7(B) shows the rupture elongations of the hard coating layer and the temperature behaviors of the in-mold transfer film according to the embodiment of the present invention.

The in-mold transfer film 33 may vary in elongation among portions of the molding. Thus, some portions of the molding may have a higher elongation than the end 38 of the side of the molding. In order to prevent cracks in these portions, as shown in FIG. 7(B), an increase of the hard-coating-layer rupture elongation line B in the right region of a mold surface temperature during mold opening is advantageously larger than those in the other regions. For example, even if the necessary elongation of the in-mold transfer film 33 in a certain portion of the molding is equal to an elongation AA that is higher than the necessary elongation A on the end 38 of the side of the molding, cracks hardly occur in the case where the hard-coating-layer rupture elongation line B has a high rupture elongation around a mold opening temperature as shown in FIG. 7(B).

Thus, the effective in-mold transfer film 33 has the property of having an increasing rate of the rupture elongation of the hard coating layer 3 relative to a temperature increase. At a surface temperature or higher during the opening of the molds used for the in-mold molding, the increasing rate is higher than that at a temperature lower than the surface temperature.

EXAMPLE

Figure 10:
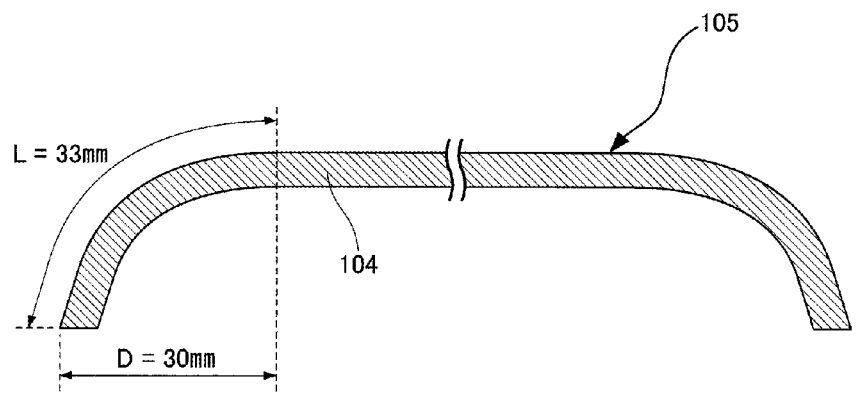
FIG. 10 is a cross-sectional view showing a molding according to an example of the embodiment of the present invention.

FIG. 10 shows the cross-sectional shape of a molding 105 according to an example. The side of the molding has a projection length of 30 mm. The molding 105 has an edge length of 33 mm on a surface where the in-mold transfer film 33 is transferred. Thus, an elongation necessary for transferring the in-mold transfer film 33 is 33/30=110% on the side of the molding.

The molding is formed by in-mold molding such that the in-mold transfer film 33 is inserted into the molds and is transferred therein. The in-mold transfer film 33 used at this time is configured such that the release layer 2 made of a resin predominantly composed of melamine was formed with a thickness of about 1 μm and the hard coating layer 3 made of an after-cure ultraviolet curing resin was formed with a thickness of 5 μm on the surface of the PET base material film 1 having a thickness of 50 μm. The anchor layer 4 having a thickness of about 1 μm was formed on the hard coating layer 3, the colored layer 5 having a thickness of about 5 μm was formed thereon by gravure printing, and the adhesive layer 6 having a thickness of about 2 μm was formed thereon. At this point, the layers were formed using a gravure coating.

As to the hard coating layer 3, the curing conditions were changed so as to have a different rupture elongation after the application of the hard coating layer 3.

Since the hard coating layer 3 is made of an ultraviolet curing resin, the progress of the curing reaction of the hard coating layer 3 can be changed according to the irradiation power and the irradiation time of ultraviolet irradiation. Curing of the hard coating layer 3 proceeds as ultraviolet irradiation is intensified, leading to a lower rupture elongation. Conversely, curing of the hard coating layer 3 does not proceed as ultraviolet irradiation is reduced, leading to a higher rupture elongation.

The after-cure hard coating layer 3 used in the example is not fully cured and thus a cure reaction to the layers formed in the in-mold transfer film needs to be stopped in a semi-cured state in order to obtain an elongation property. In this state, the rupture elongation of the hard coating layer 3 is lower than those of the other layers in the in-mold transfer film 33.

Ultraviolet irradiation with a metal halide lamp was one of the curing conditions in the manufacturing process of the in-mold transfer film 33. A mercury lamp or an ultraviolet light-emitting diode lamp may be used in ultraviolet irradiation.

Figure 11:
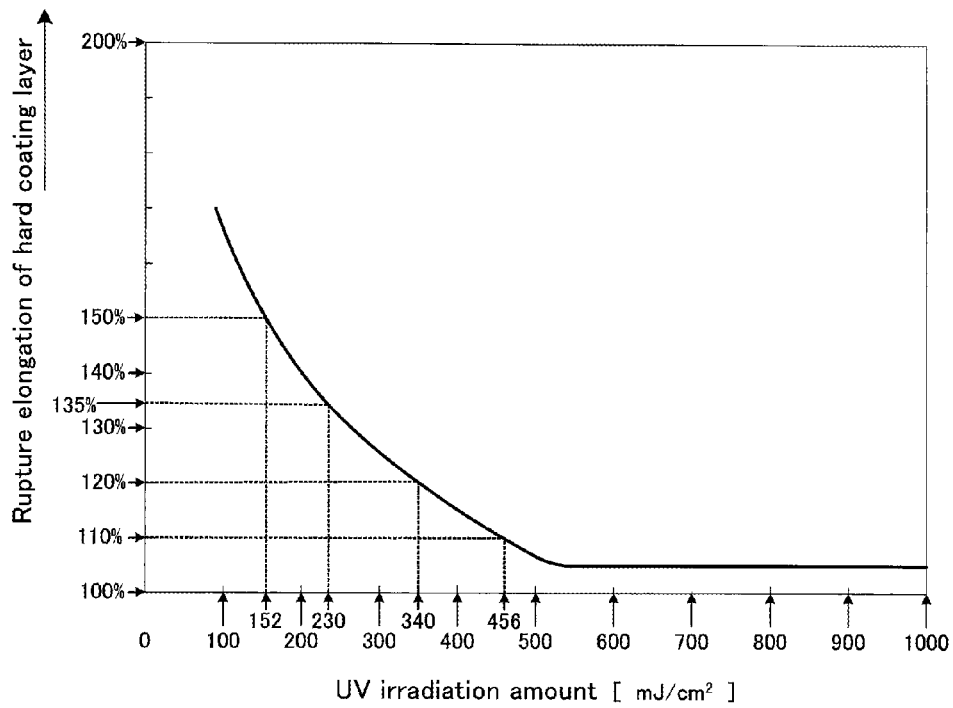
FIG. 11 shows the relationship between the rupture elongation of the hard coating layer and the integrated amount of ultraviolet irradiation according to the example of the embodiment of the present invention.

FIG. 11 shows the measurement results of rupture elongations of the hard coating layer 3 at a film temperature of 60° C. relative to the integrated amount of ultraviolet radiation. When the integrated amount of irradiation is less than 85 mJ/cm$^2$, curing of the hard coating layer 3 did not proceed and thus a rupture elongation could not be correctly evaluated. Thus, the rupture elongation was not measured as data. Curing of the hard coating layer 3 proceeded with the integrated amount of irradiation, and then the hard coating layer 3 was substantially completely cured at about 500 mJ/cm$^2$.

In this example, the hard coating layer 3 was irradiated with ultraviolet light of at least 85 mJ/cm$^2$ and less than 456 mJ/cm$^2$ so as to be placed into a semi-cured state, and the in-mold transfer film 33 was produced with a changing rupture elongation of the hard coating layer 3.

Figure 12:
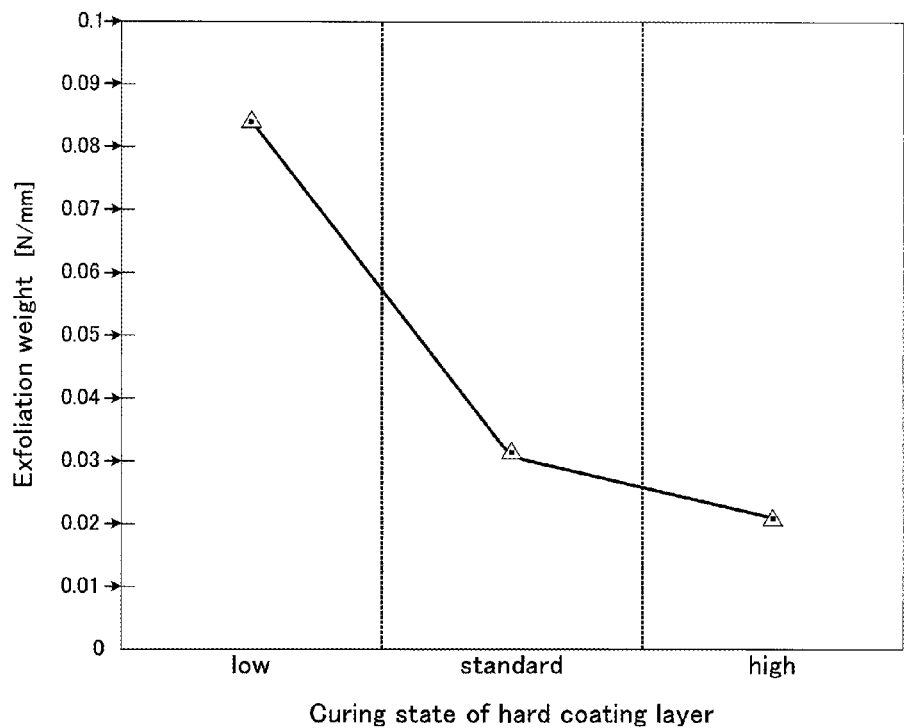
FIG. 12 shows the relationship between a curing state of the hard coating layer and a weight of exfoliation according to the example of the embodiment of the present invention.

FIG. 12 is a graph showing measurements of correlation between a curing state of the hard coating layer 3 and a weight of exfoliation.

Weights of exfoliation were plotted as follows: the in-mold transfer film 33 of each sample was cut like a strip with a width of 19 mm and was bonded onto a hot plate at 100° C. with double-sided tape, a tensile strength was measured by a load cell acting as a load transducer while the in-mold transfer film 33 was peeled off at an angle of 90° C. at a rate of 180 mm/min, and then the strength was converted into a weight of exfoliation for a 1-mm width.

Regarding the rupture elongation of the hard coating layer 3, as irradiation power to the hard coating layer 3 decreases, a weight of exfoliation in a standard state of the example increases, leading to a lower degree of curing of the hard coating layer 3, whereas as irradiation power to the hard coating layer 3 increases, a weight of exfoliation decreases, leading to a higher degree of curing of the hard coating layer 3.

The in-mold transfer film 33 was temporarily heated with an infrared heater set at 280° C. on the top of the mold and then was supplied into the molds when the surface temperature of the in-mold transfer film 33 reached about 85° C. After that, ABS resin having a resin temperature of 230° C. was injected into the molds and then was molded at a mold temperature of 60° C.

FIG. 13 shows states of molding results of an in-mold molding relative to the rupture elongation of the hard coating layer 3 when the necessary elongation of the in-mold transfer film 33 is 110%.

FIG. 14 shows a graph of occurrence rates of faulty transfer relative to the rupture elongation of the hard coating layer 3 at 60° C. in the molding of the in-mold molding with the molds opened at 60° C., the in-mold molding having the necessary elongation of 110% on the end face of the molding.

A surface condition of the molding removed after the in-mold molding was visually observed to confirm the presence or absence of faulty molding. The side of the molding that is likely to have faulty transfer was particularly intensively observed. Small cracks on the printed layer were more specifically observed with an optical microscope of a magnification of several times.

If the rupture elongation of the hard coating layer 3 is less than 112%, the rupture elongation is not enough for the necessary elongation of 110%. Thus, when the in-mold transfer film 33 is sucked to the movable mold 101, the hard coating layer 3 is ruptured. This caused cracks on the printed layer 32. The rupture elongation needs to be 112% relative to the necessary elongation of 110% because an elongation corresponding to the thickness of the hard coating layer 3 is necessary on the end 38 where exfoliation is necessary on the side of the molding discussed above.

When the rupture elongation of the hard coating layer 3 is at least 112% and less than 120%, the rupture elongation is substantially kept constant relative to the necessary elongation A. However, the printed layer 32 was partially cracked by variations in temperature and vacuum suction force during the suction of the in-mold transfer film 33, with a fraction defective of 5% or less within a tolerance.

When the rupture elongation of the hard coating layer 3 is at least 120% and less than 135%, the rupture elongation is enough for an elongation during suction. The hard coating layer 3 reaches the rupture elongation before the in-mold transfer film 33 is further extended by 10% to 30% during mold opening. Thus, the hard coating layer 3 was ruptured so as to have ideal exfoliation from the end 38 on the side of the molding.

When the rupture elongation of the hard coating layer 3 is at least 135% and less than 150%, even the in-mold transfer film 33 extended by at least 30% during mold opening does not rupture the hard coating layer 3. Thus, a foil burr appeared. The foil burr was spread and deposited on the cavity surface of the movable mold 101, causing exterior defects on the molding. If the adhesion between the hard coating layer 3 and the release layer 2 is higher than adhesion between the hard coating layer 3 and the printed layer 32, the extended hard coating layer 3 is not ruptured but remains on the release layer 2. On the end 38 of the side of the molding, the hard coating layer 3 remaining on the release layer 2 caused delamination in the printed layer 32. In this region, the defective phenomenon partially occurred due to variations in temperature and mold opening speed during mold opening, with a fraction defective of 5% or less within the tolerance.

When the rupture elongation of the hard coating layer 3 was at least 150%, the condition further deteriorated and the occurrence rate of faulty transfer further increased.

The adhesion between the hard coating layer 3 and the release layer 2 is likely to increase with resistance to peeling because the hard coating layer 3 with higher elongation can be extended according to the elongation of the in-mold transfer film 33. Thus, basically, adhesion tends to increase with a rupture elongation. If the hard coating layer 3 is peeled from the release layer 2 on a portion other than the side of the molding, peeling is not started from the end of the side of the molding and thus a foil burr is likely to occur.

If the hard coating layer 3 is not peeled from the release layer 2 at any point while the in-mold transfer film is extended, a peeling force is likely to be applied to the side of the molding. At this point, delamination is likely to occur with high adhesion.

According to this result, the rupture elongation of the hard coating layer 3 of the in-mold transfer film 33 was set at 112% or more and less than 150% relative to the necessary elongation of 110% at a temperature where the in-mold transfer film 33 is peeled from the molding, allowing the faulty transfer of the in-mold molding to have a fraction defective of 5% or less within the tolerance. Thus, in the present example, it was found that the hard coating layer 3 ruptures before the in-mold transfer film is extended by 40% relative to the necessary elongation of the in-mold transfer film during mold opening, thereby suppressing the occurrence of faulty transfer.

Moreover, the rupture elongation of the hard coating layer 3 is more desirably set at 120% or more and less than 135% so as to substantially eliminate faulty transfer.

Figure 15:
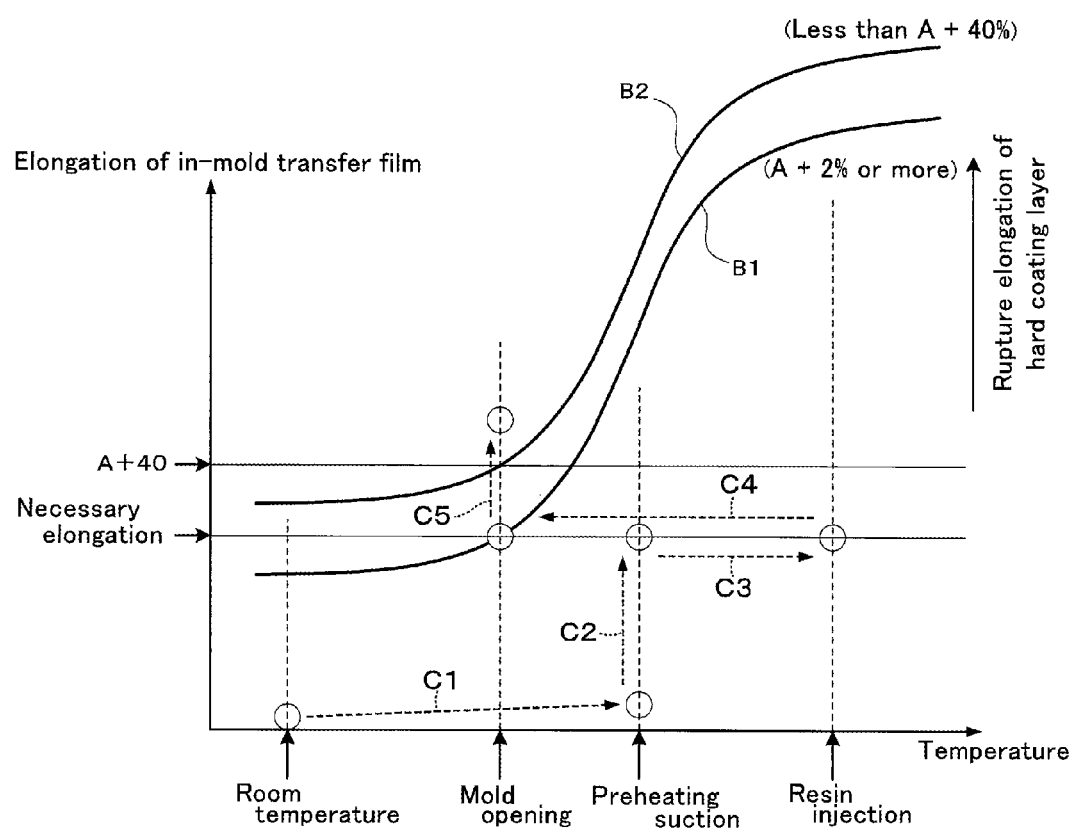
FIG. 15 shows the rupture elongations of the hard coating layer and the temperature behaviors of the in-mold transfer film according to the example of the embodiment of the present invention.

Specifically, it was found that relative to the necessary elongation A % of the in-mold molding, the rupture elongation of the hard coating layer 3 is set at A %+2% or more and less than A %+40% at a mold temperature when the in-mold transfer film 33 is peeled from the molding, allowing the in-mold molding to be produced with the occurrence rate of faulty transfer of 5% or less. FIG. 15 shows a graph of the range of rupture elongations. In FIG. 15, the same components as in FIGS. 7(A) and 7(B) are indicated by the same reference numerals and the explanation thereof is omitted.

Reference numeral B1 denotes a hard-coating-layer rupture elongation line of A %+2% and reference numeral B2 denotes a hard-coating-layer rupture elongation line of A %+40%.

Furthermore, it was found that the rupture elongation of the hard coating layer 3 is set at A %+10% or more and less than A %+25% so as to substantially eliminate faulty transfer, obtaining a more desirable state.

As shown in FIG. 11, the integrated amount of ultraviolet irradiation for curing the hard coating layer 3 may be set at 152 mJ/cm$^2$ or more and less than 456 mJ/cm$^2$ in order to set the rupture elongation of the hard coating layer 3 at 112% more and less than 150%. The integrated amount of ultraviolet irradiation for curing the hard coating layer may be set at 230 mJ/cm$^2$ or more and less than 340 mJ/cm$^2$ in order to set the rupture elongation of the hard coating layer 3 at 120% or more and less than 135%.

Thus, it was found that the integrated amount of ultraviolet irradiation for curing the hard coating layer 3 is set at 152 mJ/cm$^2$ or more and less than 456 mJ/cm$^2$ so as to produce the optimum hard coating layer 3 according to the present example. Furthermore, it was found that the hard coating layer 3 is more desirably produced at 230 mJ/cm$^2$ or more and less than 340 mJ/cm$^2$.

Consequently, adhesion was kept for an elongation according to the shape of the molding, clearly extending the transfer section 31 according to the elongation of the carrier section 30. When the carrier section 30 is peeled from the molding, the hard coating layer 3 of the transfer section is ruptured on the end of the side of the molding at the moment of extension of the in-mold transfer film during mold opening. Thus, the start point of exfoliation was formed on the end of the side of the molding, and the hard coating layer 3 was peeled from the carrier section 30 from the start point around the molding without causing a foil burr.

INDUSTRIAL APPLICABILITY

The present invention contributes to enhancement of yields in the manufacturing of decorated moldings with improved exterior designs, e.g., various electrical appliances or interior and exterior components of automobiles.

REFERENCE SIGNS LIST 1 base material film
2 release layer
3 hard coating layer
4 anchor layer
5 colored layer
6 adhesive layer
30 carrier section
31 transfer section
32 printed layer
33 in-mold transfer film
34 molding side
36 printed-portion transfer surface
37 cracks on the hard coating layer
38 molding side end
41 nozzle
42 suction hole
101 movable mold
102 stationary mold
103 cavity space
104 molding resin
105 molding
A the necessary elongation of the in-mold transfer film
B hard-coating-layer rupture elongation line
C a portion corresponding to the thickness of the hard coating layer 3 on the end where peeling is necessary on the side of the molding

The invention claimed is:

1. A manufacturing method for an in-mold transfer film used when in-mold molding is performed using an injection molding mold,
the in-mold transfer film having a release layer, a hard coating layer, and a printed layer on a base material film,
the hard coating layer being made of an ultraviolet curing resin,
the in-mold transfer film having a necessary elongation of A % on a side of a molding molded using the injection molding mold,
the manufacturing method comprising: adjusting an integrated amount of ultraviolet irradiation to the hard coating layer such that the hard coating layer has a rupture elongation in a range of at least A %+2% and less than A %+40% when a temperature of the in-mold transfer film is equal to a surface temperature during mold opening of the injection molding mold used for in-mold molding.

2. The manufacturing method for the in-mold transfer film according to claim 1, wherein the integrated amount of ultraviolet irradiation is at least 152 mJ/cm$^2$ and less than 456 mJ/cm$^2$.

3. The manufacturing method for the in-mold transfer film according to claim 1, wherein the integrated amount of ultraviolet irradiation is at least 230 mJ/cm$^2$ and less than 340 mJ/cm$^2$ such that the hard coating layer has a rupture elongation in a range of at least A %+10% and less than A %+25% on the side of the molding during the mold opening.

* * * * *